United States Patent [19]
DeArmitt et al.

[11] Patent Number: 4,568,011
[45] Date of Patent: Feb. 4, 1986

[54] VACUUM PUMP FOR DESOLDERING GUN

[76] Inventors: Clyde B. DeArmitt, 1530 Brea Canyon Cutoff Rd., Walnut, Calif. 91789; Samuel F. Sims, 1662 Wilson Ave., Arcadia, Calif. 91006; Bjorn Westly, 23902 Via Hamaca, Valencia, Calif. 91355

[21] Appl. No.: 681,560
[22] Filed: Dec. 14, 1984
[51] Int. Cl.$^4$ ................................................ B23K 3/06
[52] U.S. Cl. ........................................ 228/20; 417/328; 417/410; 92/130 C
[58] Field of Search ................. 228/19, 20; 417/328, 417/470, 415, 410; 92/130 C, 130 A

[56] References Cited

U.S. PATENT DOCUMENTS 3,114,026 12/1963 Fortune ........................... 228/19 X Primary Examiner—Kuang Y. Lin

[57] ABSTRACT

A vacuum pump for a desoldering iron gun which comprises a cylinder closed at one end with a piston movable in the cylinder, and device including a valve connecting the closed end of the cylinder to the gun. A spring normally urges the piston away from the closed end of the cylinder, and drive linkage connects the piston to a motor for moving the piston toward the closed end of the cylinder against the urging of the spring. Latch device holds the piston in position adjacent the closed end of the cylinder. Trip device for releasing the latch is operated by the same motor. Operation is initiated by a switch on the gun that starts the motor, causing the trip mechanism to release the latch, and the spring to force the piston away from the closed end to produce a partial vacuum. The motor continues to run through its cycle, again compressing the spring and moving the piston back to its latched position.

7 Claims, 4 Drawing Figures

VACUUM PUMP FOR DESOLDERING GUN

FIELD OF THE INVENTION

This invention relates to a desoldering tool, and more particularly to a vacuum pump for removing melted solder from a joint.

BACKGROUND OF THE INVENTION

To remove electrical components from a printed circuit board, for example, the solder forming the connection between the component and circuit board must be removed to free the connection. A soldering iron or gun is used to melt the solder and the solder is then withdrawn from the joint while still in the molten state. This may be done with a copper wick, or by a suction tool. An example of a hand-held solder removing tool is described, for example, in U.S. Pat. No. 3,114,026, in which a manually compressed spring is released to drive a piston in a direction to produce a or partial vacuum at an orifice or tip which is applied to the solder joint. The vacuum sucks the molten solder into the tip. Tools of this type provide a single vacuum impulse and then must be manually recocked. This is an awkward and tiring operation where large numbers of soldering joints are being desoldered using this type of tool.

Desoldering guns have been developed which can be held in one hand against the solder joint. The gun is connected through a hose to a vacuum source and a valve in the gun is opened to apply suction to the gun tip when it is needed. Another type of desoldering gun utilizes a venturi-type pump which operates from a source of compressed air. These types of guns have not proved to be entirely satisfactory for several reasons. First, a source of compressed air must be available to operate the device, and the vacuum impulse provided by the venturi is limited in the amount of vacuum that could be produced and the time required to reach peak vacuum.

SUMMARY OF THE INVENTION

The present invention is directed to an improved desoldering gun assembly and in particular to a mechanized pump device for generating a vacuum impulse for removing the molten solder from a solder joint. A vacuum pump for applying a vacuum pulse to the desoldering iron tip comprises a cylinder and a motor driven piston movable in the cylinder. A spring is connected between the piston and cylinder for urging the piston away from the closed end of the cylinder to increase the volume and thereby reduce the pressure within the cylinder. The spring is held in a compressed position by a latch mechanism with the piston positioned at the end of the cylinder to provide minimum volume. When a motor driven linkage is energized, it first trips the latch mechanism, releasing the spring and moving the piston rapidly away from the closed end of the cylinder to generate a suction at desoldering tip. The motor then recompresses the spring and latches the piston in position for the next cycle of operation.

DETAILED DESCRIPTION

Figure 1:
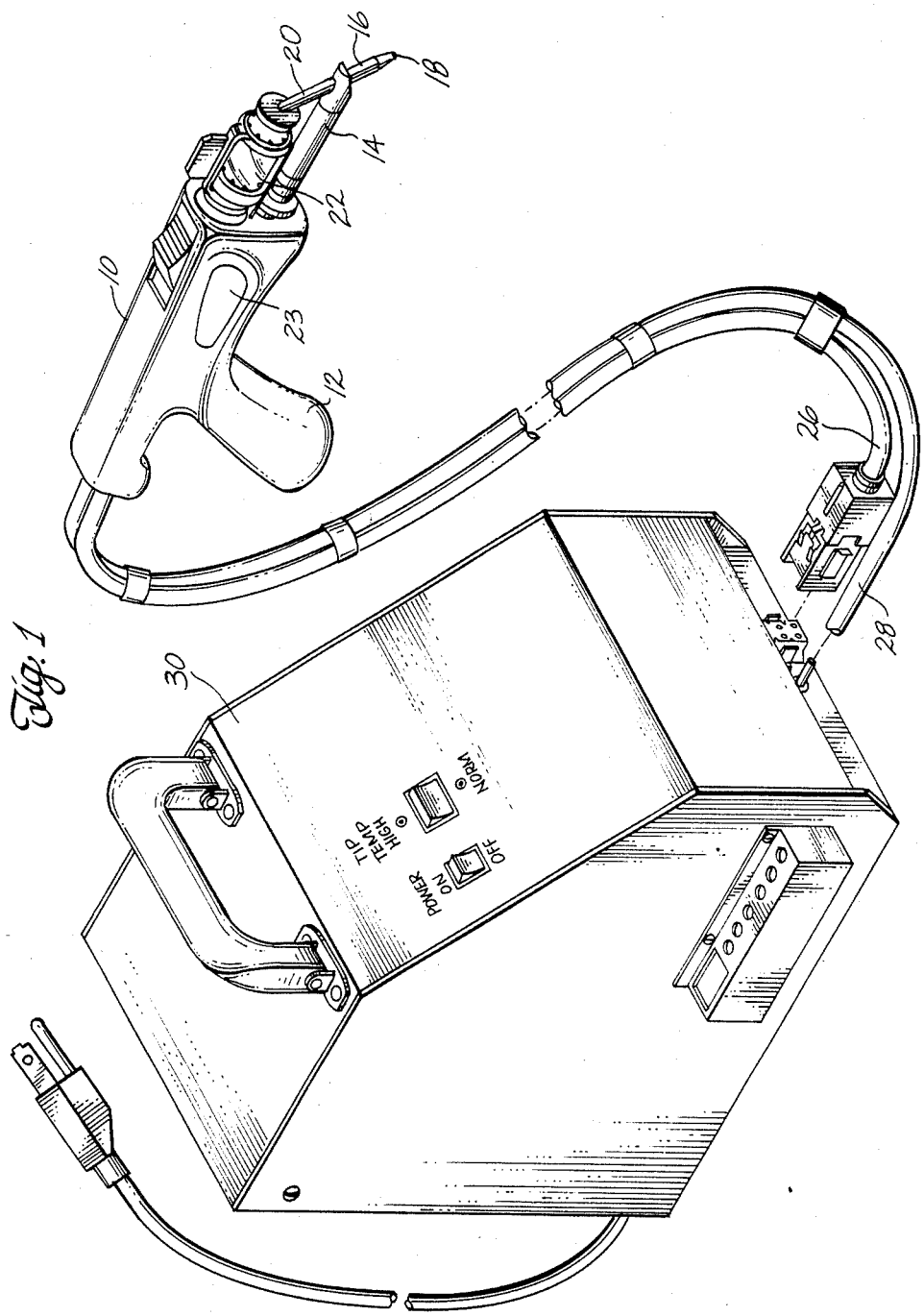
FIG. 1 is a front prospective view of the hand held desoldering gun and vacuum pump unit according to the present invention.

Referring to FIG. 1, the numeral 10 indicates generally a hand held desoldering gun which includes a pistol type grip 12 from which projects a soldering iron heater assembly 14. The heater assembly includes a tip 16 having a passage 18 which connects through a tube 20 to a solder collecting chamber 22. The chamber 22 preferably includes a removable glass cylinder containing a fibre glass or cotton filter which collects any molten solder sucked into the chamber through the hollow soldering iron tip. The gun is connected to a vacuum pump and control unit indicated generally at 24 by means of an electrical multiple connector cable 26 and a hollow vacuum tube 28. The tube 28 communicates at one end with the chamber 22 and is connected at the other end to the vacuum pump, in the unit 24, for applying a vacuum to the chamber at the appropriate time to withdraw molten solder through the soldering iron tip into the chamber. An electrical thumb-operated switch 23 at the desoldering gun controls the vacuum pump, in a manner hereinafter described, through the electrical cable 26. The vacuum pump, with operation of the switch, momentarily drops the pressure in the chamber to provide a vacuum impulse to suck the molten solder into the chamber where it is trapped by the filter material.

Figure 2:
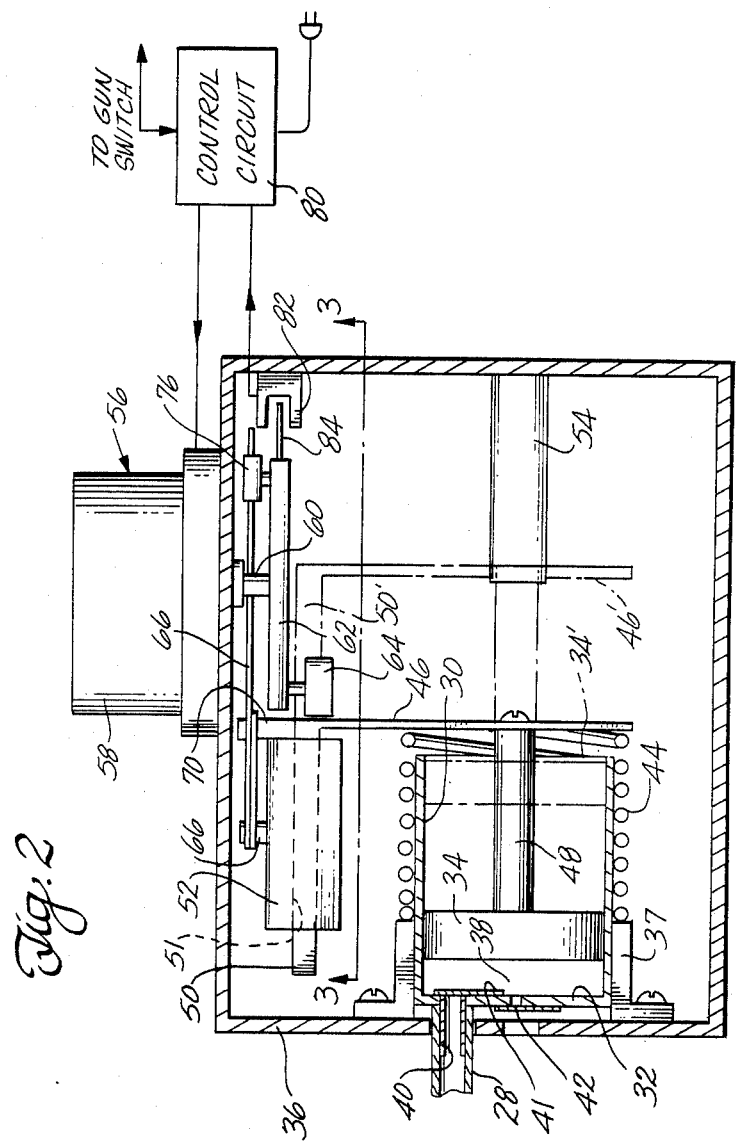
FIG. 2 is a section view of the vacuum pump unit.
Figure 3:
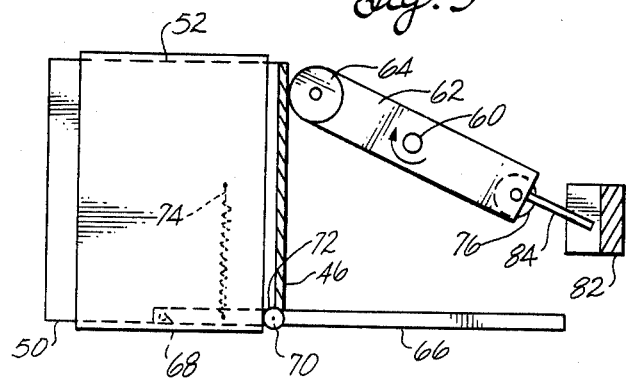
FIG. 3 and 4 illustrate the mechanism which provide for the impulse operation of the vacuum pump unit.
Figure 4:
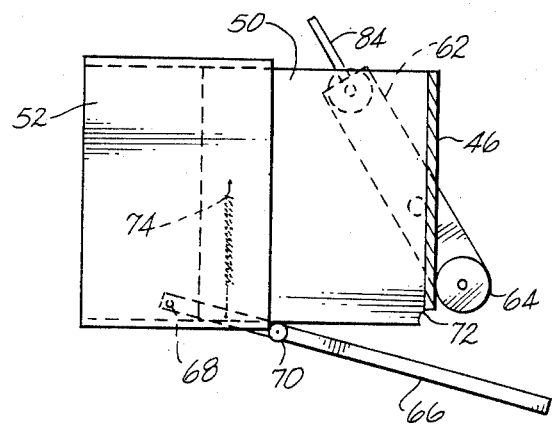

Referring in detail to FIGS. 2-4 the vacuum pump includes a cylinder 30 closed at one end by an end wall 32. Movable in the cylinder 30 is a piston 34. The cylinder 30 is secured to an outer frame or housing 36 by a mounting bracket 37. The space between the end wall 32 of the cylinder and the piston 34, indicated at 38 is fluid connected to the tube 28 extending to the desoldering gun through a nipple 40. A flap valve 41 allows air to be drawn through the nipple 40 into the cylinder during the suction stroke of the piston 34. A second flap valve 42 allows air to escape from the cylinder during the compression stroke of the piston 34.

The piston 34 is normally positioned as shown in FIG. 2 to provide minimum volume in the end of the cylinder. When a vacuum impulse is required to remove the molten solder at the gun, the piston 34 is moved abruptly to the right as viewed in FIG. 2 to the dotted position indicated at 34'. This is accomplished by means of a compression coil spring 44 which engages a guide bracket 46 attached to the piston 34 by connecting rod 48. The bracket 46 includes a slide member 50 which slidably engages an opening 51 in a Teflon guide block 52 anchored to the housing 36. The spring 44 pushes the piston and guide bracket 46 outwardly to the dotted position 46' against the stop 54.

The spring 44 is compressed and the piston 34 moved to its standby position by means of a drive assembly 56 which includes a gear-head motor 58 having an output shaft 60. The shaft is attached to a crank arm 62. A roller 64 is attached to the arm adjacent one end and moves into rolling engagement with the surface of the guide bracket 46 as the crank arm is rotated by the motor.

Referring to FIG. 3 which shows the guide bracket in the position in which the spring 44 is fully compressed, a latch mechanism including a latch arm 66 pivotally attached to the guide block 52 at 68 supports a roller 70 that engages a notch 72 at one corner of the guide member 50. In this position, the roller 70 prevents the guide member 50 and guide bracket 46 from moving under the urging 44. A tension spring 74 holds the roller 70 in the notch 72.

When the motor is energized, the arm 62 is rotated clockwise from the position shown in FIG. 3, moving a roller 76, attached to the arm 62, against the latch release arm 66. The roller 76 forces the arm 66 downwardly against the tension of the springs 74, moving the roller 70 out of the notch 72. This releases the guide bracket 46, allowing the bracket and piston 34 to move to the right, as viewed in FIG. 4, under the urging of the compressed spring 44. This results in a rapid expansion of the volume behind the piston 34, dropping the pressure within the cylinder and applying a suction at the desoldering iron tip through the tube 28.

Operation of the motor 58 is provided by a control circuit 80 from an electrical power source. When the crank arm 62 is rotated into the position shown in FIG. 3, power to the motor 58 is interrupted. This is accomplished by a sensing unit 82 which preferably includes a light source directing a beam at a light sensor, the beam being interrupted by a pin 84 projecting from the crank arm 62. The sensing unit 82 provides a signal to the control circuit 80 which causes the power to the motor 58 to be interrupted.

When the switch 23 on the desoldering gun is actuated by the operator, the control circuit 80 starts the motor 58 running, causing the roller 76 to be moved into engagement with the latch release arm 66, releasing the latch roller 70 and allowing a vacuum impulse to be generated by the release of the compression spring 44. The motor continues to rotate the arm 62, bringing the roller 64 into engagement with the surface of the guide bracket 46, as shown in FIG. 4. As the motor continues to rotate the arm 62 in a clockwise direction, the roller 64 forces the guide bracket 46 to the left as viewed in the Figure, thereby compressing the spring 44 and allowing the roller 70 to move into the latched position. The motor is stopped when the arm completes one revolution, bringing the pin 84 back into light interrupting position in the sensing unit 82. It will be noted that the arm 62 moves the roller 64 out of engagement with and out of the path of the guide bracket 46 before the roller 76 trips the latch assembly. The motor 58 preferably is of a type having a brake mechanism which releases when the motor is energized and engages automatically when the motor is de-energized so as to lock the arm 62 in position instantly when the control circuit interrupts the power to the motor. By making the piston relatively large in diameter, the change in volume in the cylinder becomes quite large with very little movement of the piston compared with the fixed volume of the tube 28 and chamber 22. Thus a sharply defined and relatively high pressure drop can be produced at the desoldering iron tip. This rapid and large drop in pressure at the tip allows the molten solder to be efficiently and completely removed from a soldered joint or terminal.

We claim:

1. In a desoldering tool having a heated tip and passage through the tip for withdrawing heated liquified solder from the tip, apparatus for applying a partial vacuum in the passage for sucking the solder into the passage, comprising:

a cylinder closed at least at one end, a piston movable in the cylinder, means including a valve fluid connecting the closed end of the cylinder to said passage, spring means connected between the piston and cylinder for normally urging the piston away from the closed end of the cylinder, a motor, means linking the motor to the piston for moving the piston toward the closed end of the cylinder against the urging of the spring, latch means for locking the piston in a position adjacent the closed end of the cylinder, trip means for releasing the latch means, and means actuated by the motor for initially activating the trip means to release the latch means.

2. Apparatus of claim 1 including switch means for turning on the motor, and control means for stopping the motor when the piston is returned by the motor to the latch means locking position.

3. Apparatus of claim 1 wherein said means linking the motor to the piston includes a crank arm rotated by the motor, and means connecting the crank arm to the piston for moving the piston against the urging of the spring into the latch means locking position, with rotation of the crank arm to a predetermined position.

4. Apparatus of claim 3 wherein said means for moving the piston disengages from the piston with continued rotation of the motor after the piston moves to the latch means locking position.

5. Apparatus of claim 4 further including means actuated by rotation of the crank arm by the motor for tripping the latch means and releasing the piston and spring.

6. A pump unit for producing a vacuum impulse at an orifice, comprising a cylinder having at least one end closed, a piston movable in the cylinder, means fluid connecting the cylinder to the orifice, a spring urging the piston in a direction away from the closed end of the cylinder, a guide member secured to the piston for moving the piston against the urging of the spring, drive means including a motor, a crank arm rotated by the motor about an axis perpendicular to the path of movement of the piston, and a roller on the crank arm engaging the guide member, the roller and crank arm pushing the guide member and piston against the urging of the spring when the crank arm is rotated from a first angular position to a second angular position by the motor, releasable latch means locking the guide means and piston when the crank arm reaches said second angular position, and means actuated by the crank arm when it is rotated to a third angular position by said motor for releasing the latch means.

7. Apparatus of claim 6 including means for stopping the motor with the crank arm position between the second and third angular position, and means starting the motor when a vacuum impulse is required, the motor moving the crank arm successively past said third, first and second angular positions.

* * * * *